United States Patent [19]

Blank et al.

[11] 4,104,551
[45] Aug. 1, 1978

[54] MEANS FOR COLLECTING MOISTURE IN CANNED ELECTRIC MOTORS

[75] Inventors: Wilhelm Blank, Speichersdorf; Ernst Roth, Pegnitz, both of Fed. Rep. of Germany

[73] Assignee: Klein, Schanzlin & Becker AG, Frankenthal, Pfalz, Fed. Rep. of Germany

[21] Appl. No.: 676,701

[22] Filed: Apr. 14, 1976

[30] Foreign Application Priority Data

Apr. 16, 1975 [DE] Fed. Rep. of Germany ....... 2516783

[51] Int. Cl.² .......................... H02K 5/10; H02K 5/22; B01D 53/04
[52] U.S. Cl. ........................................ 310/88; 55/431; 252/194; 310/65; 310/89; 310/91
[58] Field of Search ....................... 310/65, 88, 89, 91; 252/194; 55/355, 387, 421, 431

[56] References Cited

U.S. PATENT DOCUMENTS

| | | | |
|---|---|---|---|
| 3,337,802 | 8/1967 | Gill | 310/88 |
| 3,909,644 | 9/1975 | Wieser | 310/71 |
| 3,965,381 | 6/1976 | Shipman | 310/88 |

OTHER PUBLICATIONS

Condensed Chemical Dictionary, 6th Ed., 1961, pp. 353-354.

*Primary Examiner*—Benjamin R. Padgett
*Assistant Examiner*—Irwin Gluck
*Attorney, Agent, or Firm*—Peter K. Kontler

[57] ABSTRACT

An explosion-proof canned electric motor for use at elevated temperatures wherein the upper portion of the motor housing contains the stator windings and the rotor and is connected with a terminal box by means of a tubular heat barrier. The terminal box is disposed at a level below the upper housing portion and has an annular venting orifice in the lowermost part thereof so that condensate which accumulates in the housing flows toward the orifice. Such condensate is absorbed by a cake of diatomaceous earth or another suitable porous desiccant which is placed into the path of condensate flow toward the orifice. The desiccant also removes moisture from air which flows into the terminal box, and the desiccant is relieved of accumulated moisture during starting of the motor when the air in the housing expands as a result of heating and flows through the pores of the desiccant on its way into the orifice.

8 Claims, 2 Drawing Figures

MEANS FOR COLLECTING MOISTURE IN CANNED ELECTRIC MOTORS

BACKGROUND OF THE INVENTION

The present invention relates to electric motors in general, especially to explosion-proof canned electric motors which are operated at elevated temperatures, and more particularly to improvements in means for counteracting the adverse influence of condensate and/or other liquids in the housings of such motors.

Explosion-proof electric motors are often of the type $d$ (denoting pressure-tight) wherein condensate tends to accumulate as a result of changes in ambient temperature. In a simple electric motor, the condensate is evacuated through a bore, port or an analogous opening in the motor housing. In presently known explosion-proof electric motors, condensate which accumulates in the housing is collected in a bag or a similar receptacle whose contents can be evacuated from time to time by removing a liquid-discharging screw or by rotating and/or axially displacing a suitable piston.

The just described mode of accumulating and removing condensate is not satisfactory in electric motors which are operated at elevated temperatures and contain ceramic insulating materials. Moist air/or condensate in the interior of the housing affects the insulating qualities of ceramic materials, often to such an extent that the motor is brought to a stop or damaged.

SUMMARY OF THE INVENTION

An object of the invention is to provide an electric motor, especially an explosion-proof canned electric motor which is operated at elevated temperatures, with novel and improved means for collecting moisture which accumulates in and/or tends to enter the interior of the motor housing when the motor is in use.

Another object of the invention is to provide an electric motor with simple, effective and inexpensive means for collecting condensate which accumulates in the housing of a canned electric motor as a result of changes in ambient temperature and/or which tends to enter the housing with inflowing atmospheric air.

A further object of the invention is to provide novel and improved means for intercepting and collecting water which tends to flow through the venting orifice of the housing of an explosion-proof electric motor.

An additional object of the invention is to provide a novel and improved terminal box which forms part of an electric motor, especially an explosion-proof canned electric motor for use at elevated temperatures.

The invention is embodied in an electric motor, particularly in an explosion-proof canned electric motor for use at elevated temperatures which do or can fluctuate within a range sufficient to cause accumulation of condensate and/or other liquids in the interior of the motor housing. The housing comprises a hollow upper portion which contains the stator windings and the rotor (and the can, if the motor is a canned electric motor) and a hollow lower portion having a venting opening (e.g., an annular orifice at the lowermost level of the lower portion) toward which the liquid flows, and a body of hygroscopic porous desiccant (e.g., a cake of diatomaceous earth) in the lower portion of the housing. The body of desiccant is placed into the path of liquid flow toward the opening so that it absorbs the liquid. Furthermore, such desiccant can remove moisture from inflowing atmospheric air and can be relieved of some or all of the accumulated moisture by heated air which escapes from the housing, e.g., during starting of the motor.

The lower portion of the motor housing may constitute a terminal box, and the housing may further comprise a downwardly inclined tubular heat barrier which communicatively connects the upper housing portion with the lower portion so that condensate which accumulates in the upper portion can flow through the heat barrier and into the lower portion to be absorbed by the body of desiccant.

The novel features which are considered as characteristic of the invention are set forth in particular in the appended claims. The improved motor itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
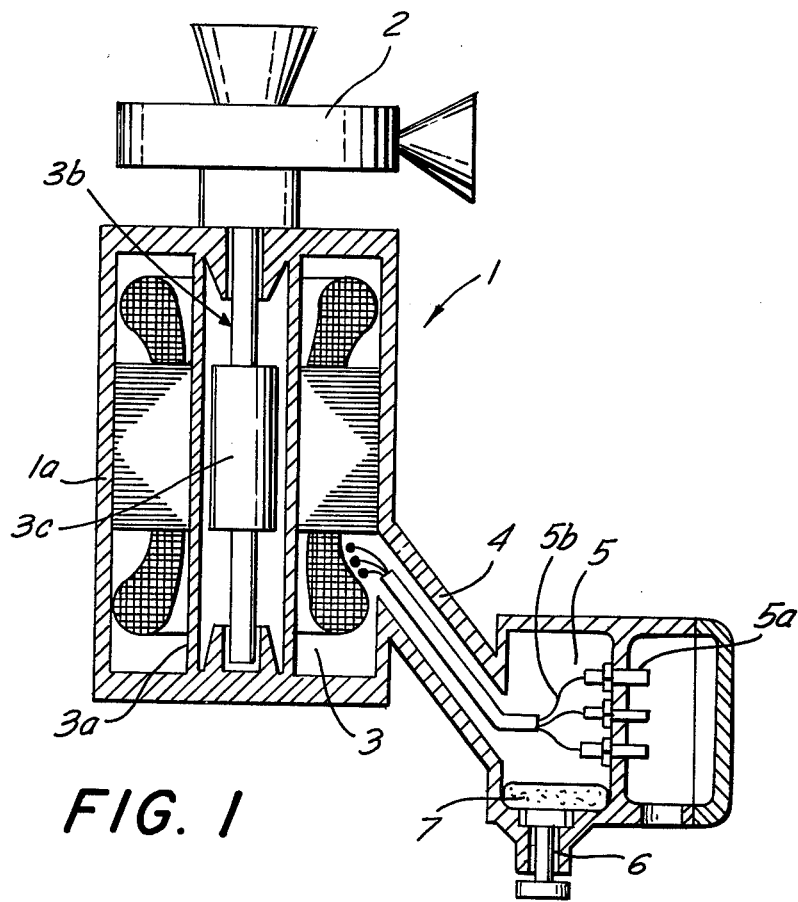
FIG. 1 is a schematic sectional view of an electric motor which embodies one form of the invention and is used to drive a centrifugal pump for heated fluids.

Referring first to FIG. 1, there is shown a centrifugal pump 2 whose drive is an explosion-proof canned electric motor 1. The housing of the motor 1 has a hollow upper portion 1a which defines a chamber 3 for stator windings and contains a centrally located can 3a which, in turn, surrounds the rotor 3b and its windings 3c. The rotor 3b drives the impeller of the centrifugal pump 2. The latter is assumed to convey a fluid which is maintained at an elevated temperature.

The housing of the motor 1 further comprises a hollow lower portion 5 which constitutes a terminal box (terminals shown at 5a) and a tubular heat barrier 4 which communicatively connects the housing portions 1a and 5. The conductors 5b which connect the terminals 5a with windings in the housing portion 1a extend through the heat barrier 4.

The lowermost part of the terminal box 5 is formed with a venting opening 6. In the illustrated embodiment, the opening 6 is an annular orifice and is disposed immediately downstream of and below a body or cake 7 of desiccant, e.g., diatomaceous earth, a commercially available hygroscopic drying agent. The body 7 is porous so that gaseous fluids can pass therethrough on their way toward and into the opening 6 or from the opening into the motor housing; however, the body 7 absorbs condensate which develops in the housing of motor 1 in response to changes in ambient temperature as well as such moisture which is contained in inflowing atmospheric air. The condensate flows by gravity toward the lowermost level of the housing, i.e., toward the lowermost part of the terminal box 5, and is intercepted and absorbed by the body 7 of desiccant. The latter also absorbs moisture which is contained in gaseous fluid flowing toward and into the opening 6 or in the opposite direction.

Figure 2:
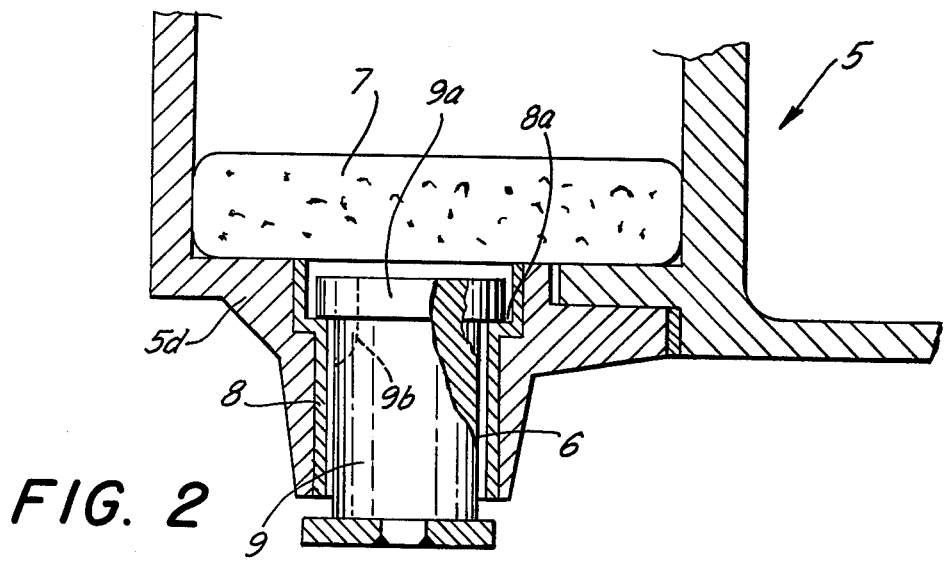
FIG. 2 is an enlarged view of a detail in the lower portion of FIG. 1.

As shown in FIG. 2, the terminal box 5 comprises a sleeve 8 which surrounds the opening 6 and a cylindrical core 9 (e.g., a bolt) which is surrounded by the opening 6 and has a head 9a resting on a shoulder 8a of the sleeve. The head 9a has grooves 9b which permit gaseous fluid to flow into the opening 6 or from the opening into the terminal box 5. In order to reduce the likelihood of corrosion, the parts 8 and 9 preferably consist of stainless steel or another suitable highly corrosion-resistant material. The body 7 rests on a section 5d which is separably secured to the main section of the terminal box 5 to afford access to the body 7.

Condensate which is likely to accumulate in the housing of the motor 1 in response to temperature changes flows downwardly in the upper portion 1a, through the tubular heat barrier 4, through the terminal box 5 and is absorbed by the body 7 of desiccant. The latter also removes moisture from gaseous fluid which penetrates through its pores and flows toward the grooves 9b on its way into the opening 6. It has been found that the placing of opening 6 into the lowermost part of the terminal box 5, together with placing of the body 7 of desiccant into the path of liquid which flows toward the opening 6, insures a complete or nearly complete absorption of liquid. The dimension (axial length and width) and configuration of the opening 6 are selected to satisfy the standards which are prescribed for pressure-tight explosion-proof drives for centrifugal pumps or the like.

As a rule, a change in volume of confined fluid takes place in the space 3 during starting or deceleration of the electric motor. Such change in volume is attributable to temperature changes. When the motor is started, the mass of air in the space 3 is heated and expands whereby some heated air flows through the heat barrier 4 and terminal box 5 into the opening 6. During flow through the pores of the body 7 of desiccant, such relatively dry air entrains moisture from the pores. During cooling of the motor, air flows from the atmosphere, through the opening 6, and into the interior of the housing. The moisture which is contained in the stream of inflowing air is intercepted and absorbed by the body 7 of desiccant which is located in the terminal box 5. Thus, the provision of desiccant in the lower portion of the motor housing insures a continuous and automatic separation of moisture from air which flows into the housing, for automatic storage of such moisture in the lowermost part of the lower housing portion, and for automatic evacuation of stored moisture during certain stages of operation of the motor. Moreover, and as mentioned above, the body 7 of desiccant also intercepts and absorbs such moisture which might be contained in air flowing from the terminal box as well as condensate which deposits in the interior of the housing in response to pronounced temperature changes.

The provision of desiccant in the motor housing enhances the safety of operation of the canned motor pump in a simple, inexpensive and highly efficient manner.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

What is claimed is:

1. An explosion-proof canned electric motor for use at elevated temperatures, comprising a housing having a hollow upper portion and a hollow lower portion, said lower portion having a venting opening at the lowermost point thereof and said opening containing a porous hygroscopic desiccant body, said desiccant body absorbing moisture which is in the air flowing from the atmosphere into said housing via said opening when the temperature in said housing decreases and from said housing into the atmosphere when the temperature in said housing increases, as well as any condensate which accumulates in said housing during operation of the motor and flows toward said opening.

2. A motor as defined in claim 1, wherein said lower portion includes a terminal box and said opening is disposed at the lowermost level of said box.

3. A motor as defined in claim 2, wherein said housing further comprises a tubular heat barrier communicatively connecting said lower portion with said upper portion.

4. A motor as defined in claim 3, further comprising windings in said upper portion.

5. A motor as defined in claim 1, wherein said desiccant is diatomaceous earth.

6. A motor as defined in claim 1, wherein said opening is an annular orifice.

7. A motor as defined in claim 1, wherein said lower portion includes a removable section to afford access to said desiccant body.

8. A motor as defined in claim 1, wherein said desiccant body is a cake which overlies said opening.

* * * * *